Jan. 20, 1942.  E. O. ROEMHILD  2,270,604
DRIVING COUPLING FOR PIPES
Filed June 23, 1939

Inventor:
EDMUND O. ROEMHILD,
by: John E. Jackson
his Attorney.

Patented Jan. 20, 1942

2,270,604

UNITED STATES PATENT OFFICE 2,270,604

DRIVING COUPLING FOR PIPES

Edmund O. Roemhild, Pittsburgh, Pa., assignor to National Tube Company, a corporation of New Jersey Application June 23, 1939, Serial No. 280,883

1 Claim. (Cl. 285—161)

This invention relates to driving couplings for pipes such as a pile made up of several sections of pipe, and more particularly wherein the diameters of the sections of the pipe are not uniform throughout the entire length of the pile but decrease progressively to the bottom section.

One object of this invention is to provide an inexpensive device for coupling two sections of pipe of different diameters which will maintain the pipes in axial alignment, prevent them from telescoping and enable the transmission of a driving blow from one section to another as effectively as if the two sections of pipe were of the same diameter and abutting.

Other objects will be apparent from the following description and related drawing.

Figure 2:
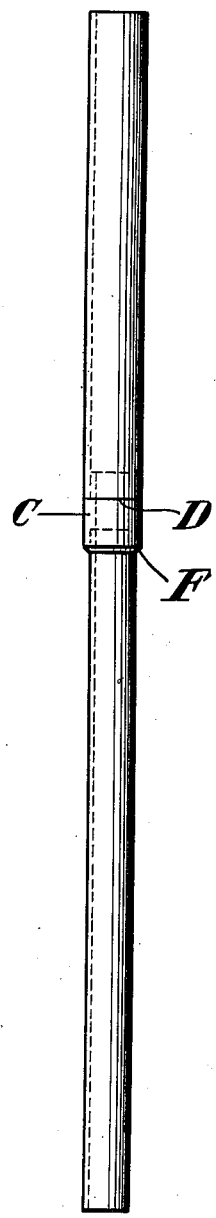
Figure 2 is an elevation of a section of a pile made up of two pieces of pipe of different diameters and embodying the device of the invention.
Figure 1:
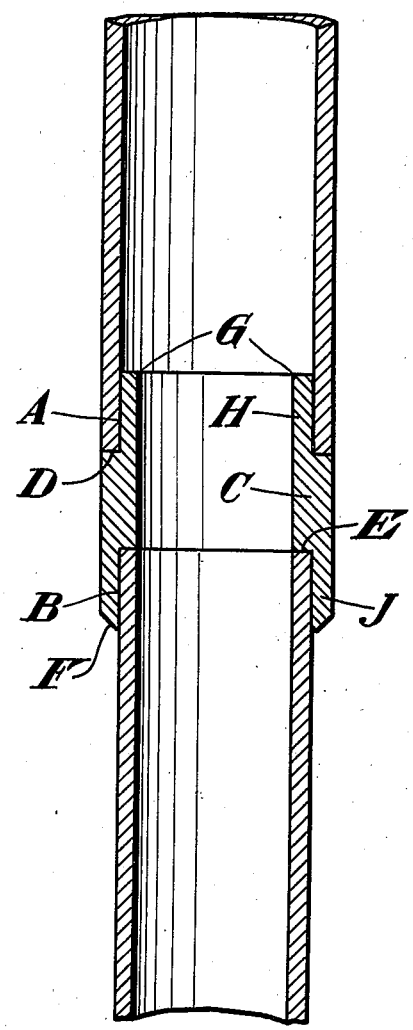
Figure 1 is a sectional elevation of two pieces of pipe of different diameters with a coupling constructed in accordance with the present invention.

In driving pipe piling having a uniform diameter throughout its entire length, the pipe sections of which it is composed are connected together by a coupling or collar which telescopes the ends of the adjacent pipes or by one that is telescoped by them. A flange or annular ring midway between the ends of the collar projects between the ends of the pipe against which they abut. This flange centers the collar between the pipe ends and holds it in place while the collar aligns the pipe sections axially. A driving blow or force applied to the top section of the pile by the usual driving apparatus is transmitted from section to section through the flange of the collar.

Collars of the above designs can be used for connecting two sections of pipe of different diameters but they are expensive, cumbersome and either act as an additional resistance to driving by presenting an increased diameter of the pile at each joint or reduce the inside diameter of the pile at the collar which acts as an obstruction when filling the pile with concrete.

The coupling or collar of the present invention eliminates all of these objectionable features and in addition possesses the advantages of simplicity in form, minimum use of material, economy in manufacture, and maximum efficiency in use. It consists essentially of a cylindrical sleeve whose inside diameter approximates that of the smaller, and the outside diameter that of the larger, pipes which it interconnects. At one end the coupling or collar is recessed exteriorly, as at A, to permit of its being telescoped by the larger pipe for a short distance, while at the opposite it is similarly recessed, as at B, on the inside for telescoping for approximately the same distance the end of the smaller pipe.

These recesses are concentric so that as the pipes fit into them they are aligned axially. Moreover, the collar is held in position by the shoulders D and E at the ends of the recesses and sections H and J. The midsection C of the coupling or collar is of a length determined by the grade of steel from which the collar is made, that is, of a grade that will withstand shearing and deforming forces. This midsection must also be of a quality and length to enable the transmission, without any collapsing effect on either pipes or coupling, of the blows or forces used in driving the pile into place. The purposes of the sections H and J of the coupling or collar are to bring the two pipes into axial alignment and prevent their collapse at these points; and, while the midsection C is the connecting means between them, its chief function is to transmit the driving blow or force from the large pipe to the smaller one with the greatest efficiency.

The integral construction of the coupling or collar combines these elements in a simple, efficient and economical design.

The bevel F at the lower end of the coupling or collar contributes toward easier driving by forcing any opposing material to the side. The interior corners G of the collar may also be beveled or rounded so as to reduce the tendency for filling material, such as concrete, to hang thereon.

The coupling or collar of the present invention not only permits the full length of each section of pipe to be used effectively but adds thereto the midsection against which the adjacent pipe ends abut.

While I have shown and described one specific embodiment of my invention, it will be understood that I do not wish to be limited thereto, since various modifications may be made without departing from the scope of my invention, as defined in the appended claim.

I claim:

A driving coupling for hollow piling sections of different diameters but substantially the same wall-thickness, comprising a cylindrical ring-like member having an inside diameter which is substantially the same as the inside diameter of the smaller section, the outside diameter of said ring-like member being substantially the same as the outside diameter of the larger section, axially extending flanges on said ring-like member adapted to engage inside the larger diameter section and outside the smaller diameter section respectively, said ring-like member providing substantially flat circular abutments at the bases of the inner and outer flanges to provide seats for the adjacent ends of the hollow piling sections to be driven, the outer flange being beveled to facilitate passage into earth.

EDMUND O. ROEMHILD.